United States Patent [19]

Hayden

[11] Patent Number: 5,466,645

[45] Date of Patent: Nov. 14, 1995

[54] METHOD FOR REACTIVATING NITROGEN-TREATED CARBON CATALYSTS

[75] Inventor: Richard A. Hayden, Pittsburgh, Pa.

[73] Assignee: Calgon Carbon Corporation, Pittsburgh, Pa.

[21] Appl. No.: 219,207

[22] Filed: Mar. 29, 1994

[51] Int. Cl.$^6$ ............................. B01J 38/02; B01J 38/00
[52] U.S. Cl. ................................. 502/56; 502/20
[58] Field of Search ................... 502/34, 54, 56

[56] References Cited

U.S. PATENT DOCUMENTS

| | | | |
|---|---|---|---|
| 1,528,905 | 3/1925 | Woodruff | 502/34 |
| 3,700,563 | 10/1973 | Karweil et al. | 502/34 |
| 4,219,537 | 8/1980 | Steiner | 502/55 |
| 4,256,606 | 3/1991 | Noack et al. | 502/34 |

FOREIGN PATENT DOCUMENTS 4842356  12/1973  Japan.

*Primary Examiner*—Asok Pal
*Assistant Examiner*—Patrick J. Neill
*Attorney, Agent, or Firm*—Titus & McConomy

[57] ABSTRACT

A method is provided for the restoration of catalytic activity in deactivated nitrogen-treated carbon catalysts. Nitrogen-treated carbon catalysts are those carbonaceous chars which have been subjected to nitrogen-containing compounds at temperatures above about 700° C. These nitrogen-containing compounds can be present either as part of the char raw material or as an additive to the char at any point during its manufacture. The method provides for a means to restore catalytic activity which is largely independent of the mechanism by which deactivation of the catalyst sites occurs. In the present invention, the deactivated nitrogen-treated carbonaceous char is heated to temperatures greater than 700° C., followed by cooling in an inert atmosphere. While at temperatures above 700° C., the char can be exposed to gasifying agents such as steam, carbon dioxide, or oxygen.

6 Claims, 1 Drawing Sheet

METHOD FOR REACTIVATING NITROGEN-TREATED CARBON CATALYSTS

FIELD OF THE INVENTION

The present invention relates to a method for reactivating and restoring the catalytic activity of deactivated nitrogen-treated carbon catalysts.

BACKGROUND OF THE INVENTION

Various methods are known for imparting catalytic activity to carbonaceous chars by treatment with nitrogen-containing compounds. In some treatments a high-temperature char such as a charcoal or activated carbon is heated at temperatures above 700° C. in the presence of a nitrogen-containing compound such as ammonia or an amine. In other treatments activation of the char with steam and exposure to the nitrogen-containing compound occur simultaneously. Other processes incorporate the nitrogen-containing compound directly into the raw material used to produce the char. In an especially effective method, the nitrogen-containing compound is introduced after low-temperature carbonization and oxidation of a nitrogen-poor char feedstock but before high temperature exposure and condensation of the carbon structure. This method produces the highest known functional utility with the least economic and environmental costs. For the purposes herein all carbons produced by such processes will be referred to as "nitrogen-treated carbons."

The nitrogen-treated carbons have the ability to function as catalysts per se without the addition of metal impregnants. They have utility in a number of applications such as sulfide oxidation and peroxide decomposition. During use the nitrogen-treated carbon can become deactivated, losing their catalytic activity and requiring that they be replaced with fresh catalyst material.

The mechanism of deactivation is not known or understood. However, it has been postulated that two principal means of deactivation may be involved. These postulates are based upon analogies to other systems employing heterogeneous catalysis. In one case, the carbon catalyst is thought to become deactivated as a result of occlusion of the catalyst sites by material physically adsorbed on or in the carbon. These materials may be reaction products or secondary adsorbates unrelated to the catalysis reactions. This mechanism is hereinafter referred to as "site occlusion."

The other postulated case suggests that the catalyst sites become deactivated by direct reaction and poisoning with moieties involved in the catalysis or with secondary materials which act only as site poisons. This mechanism is hereinafter referred to as "site poisoning." Most cases of catalyst deactivation can be accounted for by some combination of the site occlusion and site poisoning mechanisms. Of these two mechanisms, site poisoning is believed to be the most serious since it involves a fundamental change in the reactive properties of the catalyst site.

Very few methods are known for the restoration of catalytic activity in deactivated nitrogen-treated carbon catalysts. Those methods involve primarily low-temperature thermal treatments, i.e. treatments conducted at temperatures below about 700° C., and more particularly below 500° C. The main source of catalyst deactivation in such cases has been the presence of sulfur oxide compounds ($SO_x$) which can be readily removed in that temperature range. Other interferents, such as organic hydrocarbons, are largely absent. The primary mechanism of catalyst deactivation in these instances appears to be one of site occlusion.

One example of reactivation above 700° C. involves the removal of oxalic acid or water to restore catalytic activity. Again, the primary mechanism of deactivation appears to be one of site occlusion. However, since oxalic acid decomposes at only about 189° C. into formic acid (b.p. 101 C.) and carbon dioxide, and since water vaporizes at 100° C., this does not appear to be representative of a reactivation process which requires temperatures above about 700° C. Therefore, the general utility of these known methods in this area is unknown. This is thought to be because high temperature treatments have certain features which would be expected to diminish the recovered activity of the reactivated catalyst. High temperature treatments in steam or other oxidizing agents, for example, would be expected to cause losses in carbon mass and, therefore, significant losses in recovered catalytic activity. Also, since the catalytic sites appear to function primarily as sites for oxidative catalysis, there is a possibility that such sites will preferentially catalyze their own destruction at high temperatures. On the other hand, high temperature treatments under inert conditions can lead to extensive cracking of organic hydrocarbon adsorbates. Organic materials such as these can be common constituents in many process streams. Such cracking would lead to the deposition of pyrolytic carbon on the catalyst sites. The result of this deposition could also be deactivation of the catalyst sites. This type of deactivation is common in many conventional catalyst applications.

Notwithstanding the problems involved, high-temperature treatment is generally desirable in those cases where a significant proportion of site deactivation occurs as a result of occludates or poisons that can be removed from the carbon surface in no other convenient manner. For example, it has been observed that oxygen can poison the catalyst sites in nitrogen-treated carbon catalysts at temperatures above ambient. The degree of poisoning increases with increasing oxygen exposure and increasing exposure temperatures. Such poisoning becomes particularly extensive at temperatures above about 400° C. Therefore, low temperature thermal treatment as practiced by known art would be unable to restore significant catalytic activity in such cases and may, in fact, accentuate the problem.

Accordingly, it is the object of the present invention to provide a method for reactivating spent nitrogen-treated carbonaceous chars by the use of high temperature thermal treatments which can remove both catalyst site poisons and occludates and restore activity to the material. It is a further object of the present invention to provide a method for reactivation which is compatible with process equipment and practices currently available for the high temperature treatment of non-nitrogen treated carbon materials. In this way reactivation costs can be minimized and the utility of conventional high temperature treatment equipment greatly extended.

SUMMARY OF THE INVENTION

The present invention comprises a high-temperature thermal method for the restoration of catalytic activity in nitrogen-treated carbonaceous chars which have become deactivated by use. Generally, such chars are produced by prior treatment of a carbonaceous material at temperatures above about 700° C. in the presence of a nitrogen-containing compound or compounds. The utility of such chars, once deactivated in a given application, may be extended by means of the present invention.

In the present invention the deactivated material is exposed to temperatures above 700° C. The temperatures are achieved either by direct radiant heating or by the use of a thermal transfer agent such as an inert gas. Where severe poisoning has occurred in the spent carbon catalyst, the use of an oxidizing agent such as steam, carbon dioxide, or oxygen can be used in conjunction with temperatures above 700° C. and preferably at or above 950° C. After treatment, the reactivated carbon is cooled to temperatures below 400° C., preferably below 200° C., in an oxygen-free or otherwise inert atmosphere. It has been surprisingly found that using the present invention, significant carbon yield losses arising from such treatment does not result in significant losses in the catalytic activity of the reactivated material. It has been unexpectedly found that the catalyst sites also appear to be largely unaffected by pyrolitic carbon residues created by the cracking of organic hydrocarbons.

In a preferred embodiment of the present invention, the spent nitrogen-treated carbon catalyst is treated with steam at temperatures above 700° C. such that the Apparent Density of the reactivated material is about equal to or slightly less than the original Apparent Density of the material. Additional treatment with steam at high temperatures may also be used if the catalytic activity of the reactivated material is not equal to that of the virgin material. In both cases, immediately after such treatment, the reactivated carbon is cooled in an oxygen-free or otherwise inert atmosphere to temperatures less then 400° C., preferably less than 200° C. This treatment is particularly suited for reactivating spent nitrogen-treated carbons which may also require removal of some of the original carbon structure to restore the catalytic activity to near virgin levels.

In another preferred embodiment of the present invention, the catalytic activity of the spent carbon is restored by heating at temperatures above 700° C. in an inert atmosphere. This treatment is useful for the removal of deactivating species which are primarily physi-sorbed, occluding the catalyst sites, or which can be separated thermally from the carbon structure if chemi-sorbed. This embodiment is suitable for use where it is important to preserve the majority of the original carbon mass. Immediately after such treatment, the reactivated carbon is cooled in an oxygen-free or otherwise inert atmosphere to temperatures less than 400° C., preferably less than 200° C. Surprisingly, the apparent deposition of pyrolitic carbon arising from the cracking of organic hydrocarbon materials generally does not interfere with subsequent functioning of the catalyst sites. Other advantages of the invention will become apparent from a perusal of presently preferred embodiments taken in connection with the accompanying drawing.

PRESENTLY PREFERRED EMBODIMENTS

Figure 1:
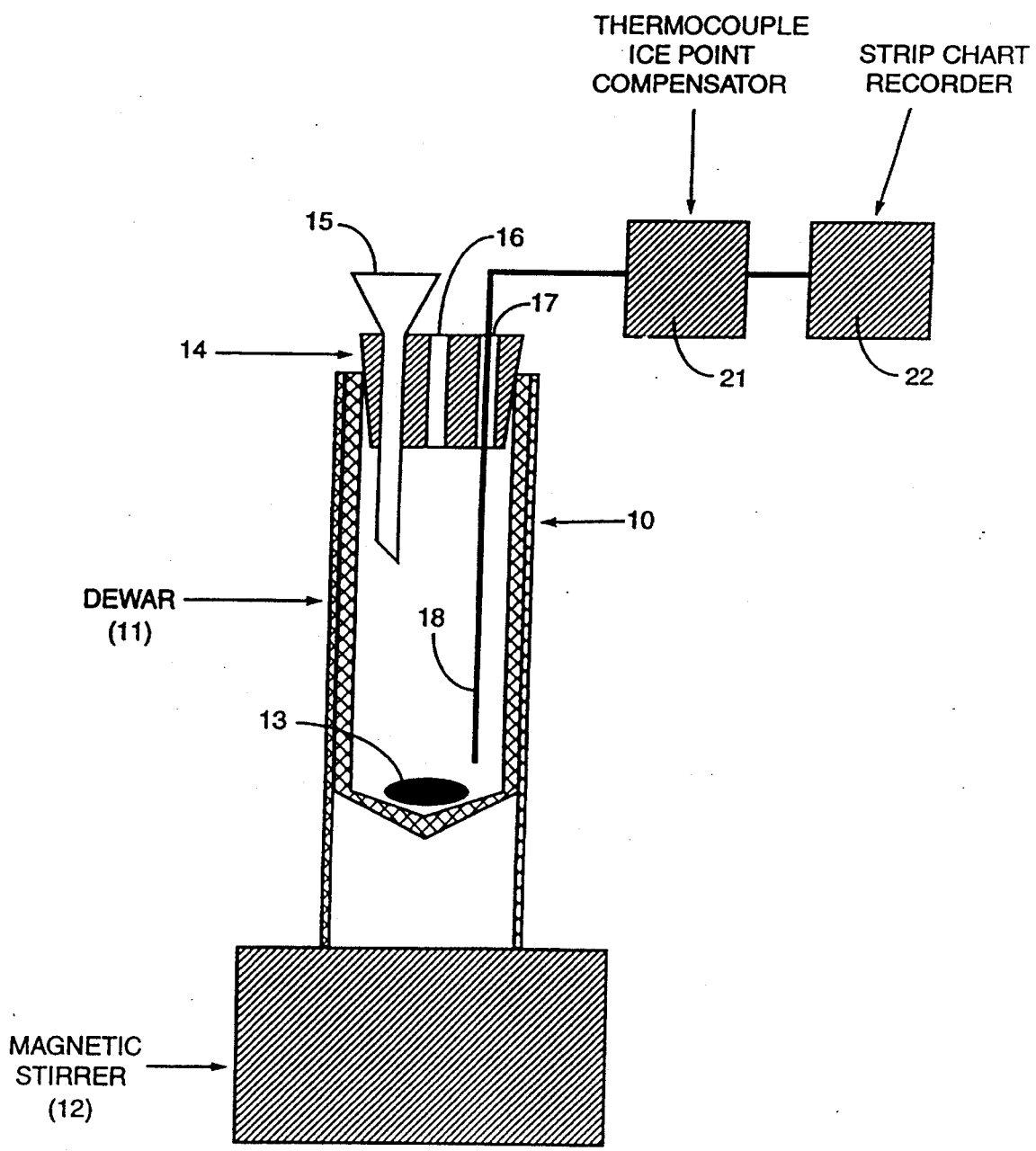
FIG. 1 is a diagrammatic view of a representative apparatus for measuring the liquid-phase catalytic activity of virgin, spent, and reactivated nitrogen-treated carbons prepared as described in the present invention.

The following examples are illustrative of the present invention. In these examples, samples of a nitrogen-treated carbonaceous char are deactivated by "site occlusion" using toluene and by "site poisoning" by exposure to 450° C. oxygen. The deactivated carbons are then reactivated by either inert heating or by a gasifying agent such as steam according to the present invention. The catalytic activities of the virgin, deactivated, and reactivated carbons are determined in the liquid phase by their ability to catalytically decompose hydrogen peroxide and in the gas phase by their ability to catalytically oxidize hydrogen sulfide.

Examples 1–3 provide representations of preferred embodiments of the invention wherein nitrogen-treated carbon catalysts deactivated by site-occluding compounds such as toluene are reactivated by inert high temperature exposure as in Example 1, by steam activation as in Example 2, or by steam-air (oxygen) activation as in Example 3.

Examples 4–6 provide representations of preferred embodiments of the invention wherein nitrogen-treated carbon catalysts deactivated by site-poisoning compounds such as 450 C oxygen are reactivated by inert high temperature exposure as in Example 4, by steam activation as in Example 5, or by steam-air (oxygen) activation as in Example 6.

EXAMPLE 1

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was carbonized and oxidized at temperatures between about 300° C. and 400° C. for at least 3 hours. The resultant oxidized char was cooled to near ambient temperatures and subsequently impregnated with an aqueous urea solution and dried. The quantity of urea solution used was sufficient to produce a 2–4% urea loading on a dry weight basis. After impregnation, the impregnated oxidized char was rapidly heated to about 950° C. in a furnace and maintained at that temperature for approximately 1 hour. Immediately following this calcination treatment the material was contacted with steam, while maintaining a 950° C. temperature, for a period of time sufficient to achieve an Apparent Density (Test Method TM-7, Calgon Carbon Corporation, Pittsburgh, Pa.) of about 0.51 grams per cc (g/cc) in material sized to 4×6 mesh (U.S. Standard Series sieves). After gasification, the material was cooled to ambient temperature under an inert atmosphere.

The liquid-phase catalytic activity of the resultant virgin nitrogen-treated carbon was determined by measuring the elapsed time required for a 0.250 gram portion of this material to decompose a given quantity of aqueous hydrogen peroxide. The lower the elapsed time, the greater is the level of peroxide decomposition and, therefore, the greater is the catalytic activity of the sample. The elapsed time is referred to as the "t-¾ time". This measurement is accomplished using the test procedure defined in U.S. patent application Ser. No. 08/006,470, filed Jan. 21, 1993 and assigned to the assignee of the present invention which is incorporated by reference herein, and provides the results in terms of t-¾ time.

The t-¾ time is determined in the following manner: With reference to FIG. 1, an apparatus 10 is shown which is useful in conducting the tests of the present invention. Apparatus 10 includes a Dewar 11 (Catalog No. 10-195A, Fisher Scientific Co., Pittsburgh, Pa., or equivalent) positioned on a magnetic stirrer 12 (Model PC-351, Corning Hot Plate Stirrer, Corning Scientific Products, Corning, N.Y., or Model 18425 Nuova II Stir Plate, Thermolyne Corporation, Dubuque, Iowa, or equivalent) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22. In practice, the carbonaceous char to be tested is first pulverized such that greater than 90% of the material would pass through a 325 mesh U.S. Standard Series sieve. The styrofoam cap 14 of Dewar 11 is removed and a 0.250 gram portion of this pulverized material is placed therein. Deionized water (100 mL) is then added to the Dewar. The addition of this water is performed in such a manner that any pulverized carbonaceous char clinging to the sides of the Dewar 11 is carried into the main body of the water in the bottom. Next, a 50 mL aliquot of aqueous buffer solution is added to the Dewar 11. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about ½" deep is formed in the mixture and the optimum stirring speed is achieved. The optimum stirring speed is selected such that additional increases in stirring speed do not significantly affect peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stirrer 12. Optionally, Dewar 11 can be replaced with an equivalent unit that, due to manufacturing variances, positions the stir bar further into the magnetic field of the stirrer 12. If the stir bar still does not adequately couple with the magnetic field of the stirrer 12, the Dewar can be shortened by removing some of the bottom portion of the outside metal casing. Styrofoam cap 14 is now replaced, and thermocouple 18 (Type K or J, 1/16" diameter, Inconel sheathed, ungrounded or equivalent) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn., or equivalent) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar 11 through the funnel 15 in the styrofoam cap 14. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40 C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the char to decompose three-fourths of the available hydrogen peroxide and is referred to as the t-¾ time. This value is reported in units of minutes. Typical values of the t-¾ time for commercial activated carbons are in excess of 30 minutes.

The t-¾ time of the virgin nitrogen-treated carbon prepared as described above was 10 minutes.

The gas-phase catalytic activity of the virgin nitrogen-treated carbon prepared as described above was determined by measuring the hydrogen sulfide breakthrough capacity of the carbon according to Calgon Carbon Test Procedure TM-41R (Calgon Carbon Corporation, Pittsburgh, Pa.), the sole exceptions residing in (1) the bed diameter which for this work was 22 mm instead of 19 mm and (2) the addition of at least 1% by weight of moisture to the carbon to initiate the hydrogen sulfide removal reaction. This method measures the ability of a carbon to catalytically oxidize hydrogen sulfide in a gas stream in which oxygen and water vapor are also present. In this method a nine-inch bed of the carbon to be tested is exposed to an air stream containing 1.0 vol % of hydrogen sulfide at about 80% relative humidity under conditions of ambient temperature and pressure. The total flowrate of the gas stream is about 1450 mL per minute. The column effluent is monitored until breakthrough of hydrogen sulfide to 50 parts-per-million by volume is observed. The elapsed time required to achieve this breakthrough is called the hydrogen sulfide breakthrough time and is expressed in units of minutes. The hydrogen sulfide breakthrough capacity is then calculated by multiplying the breakthrough time by the mass flowrate of hydrogen sulfide per unit volume, in this case 0.000254 grams of hydrogen sulfide per cc-minute.

The hydrogen sulfide breakthrough time of the virgin nitrogen-treated carbon prepared as described above was 433 minutes; the breakthrough capacity, 0.110 grams of hydrogen sulfide per cc of carbon (g $H_2S$/cc).

A sample of the virgin nitrogen-treated carbon prepared as described above was exposed in air to toluene vapors such that approximately 30% of the original carbon weight was adsorbed into the carbon pore structure as toluene. The Apparent Density of the toluene-loaded carbon was 0.67 g/cc. A sample of this carbon, weight-adjusted to account for the toluene loading, displayed a t- ¾ time of 165 minutes, indicating significant deactivation of the catalyst sites in the liquid phase. This carbon also displayed a hydrogen sulfide breakthrough time of 2 minutes and a breakthrough capacity of less than 0.001 g $H_2S$ per cc of carbon, indicating significant deactivation of the catalyst sites in the gas phase as well.

To illustrate the method of the present invention, a sample of the carbon deactivated by toluene as described above was exposed in a rotary kiln to temperatures of about 950° C. in a 2 L per minute nitrogen gas stream for about 15 minutes, and then cooled to ambient from 950° C. under an inert atmosphere. The Apparent Density of this reactivated sample was 0.52 g/cc. The small increase in Apparent Density as well as the green coloration of the smoke issuing from the kiln provided strong indications of thermal cracking of the toluene on the carbon surface. However, the t-¾ time of the reactivated sample was 7 minutes, demonstrating almost complete recovery of catalytic activity in the liquid phase. The reactivated sample also displayed a hydrogen sulfide breakthrough time of 420 minutes and a breakthrough capacity of 0.107 g $H_2S$ per cc of carbon, demonstrating nearly complete recovery of catalytic activity in the gas phase.

EXAMPLE 2

A sample of the virgin nitrogen-treated carbon prepared as described in Example 1 and loaded with toluene as described in Example 1 was exposed in a rotary kiln to temperatures of about 950° C. in a 2.5 gram per minute flow of steam for about 15 minutes. The sample was then cooled from 950 C. to ambient under an inert atmosphere. The Apparent Density of this reactivated sample was 0.49 g/cc indicating about a 4% loss in carbon structure. However, the t-¾ time of the reactivated sample was 8 minutes, demonstrating almost complete recovery of catalytic activity in the liquid phase. The reactivated sample also displayed a hydrogen sulfide breakthrough time of 412 minutes and a breakthrough capacity of 0.104 g $H_2S$ per cc of carbon, demonstrating nearly complete recovery of catalytic activity in the gas phase.

EXAMPLE 3

A sample of the virgin nitrogen-treated carbon prepared as described in Example 1 and loaded with toluene as described in Example 1 was exposed in a rotary kiln to temperatures of about 950 C. in a 2.5 gram per minute flow of steam for about 15 minutes. The steam also contained about 2 volume % of oxygen introduced as air to the steam flow. The sample was then cooled from 950 C. to ambient under an inert atmosphere. The Apparent Density of this reactivated sample was 0.49 g/cc indicating about a 4% loss in carbon structure. However, the t-¾ time of the reactivated sample was 9 minutes, demonstrating almost complete recovery of catalytic activity in the liquid phase. The reactivated sample also displayed a hydrogen sulfide breakthrough time of 440 minutes and a breakthrough capacity of 0.116 g $H_2S$ per cc of carbon, demonstrating minimally complete recovery of catalytic activity in the gas phase as well.

EXAMPLE 4

Approximately one kilogram of the virgin nitrogen-treated carbon prepared as given in Example 1 was exposed to an air flow of 10 L per minute in a rotary kiln at 450° C. for 2 hours. The Apparent Density of the oxidized carbon was 0.51 g/cc. The t-¾ time of the oxidized carbon was 57 minutes, indicating significant deactivation of the catalyst sites in the liquid phase. The oxidized carbon also displayed a hydrogen sulfide breakthrough time of 99 minutes and a breakthrough capacity of 0.025 g $H_2S$ per cc of carbon, indicating significant deactivation of the catalyst sites in the gas phase.

To demonstrate the practice of the current invention, a sample of the carbon deactivated at 450° C. by oxygen-containing air as described above was exposed in a rotary kiln to temperatures of about 950° C. in a 2 L per minute nitrogen gas stream for about 60 minutes, and then cooled to ambient from 950° C. under an inert atmosphere. The Apparent Density of this reactivated sample was 0.49 g/cc, the small decrease in Apparent Density indicating devolatization (as carbon-oxygen gases) of oxygen chemi-sorbed during the prior oxidation of the sample at 450° C. However, the t-¾ time of the reactivated sample was 11 minutes, demonstrating nearly complete recovery of catalytic activity in the liquid phase. The reactivated sample also displayed a hydrogen sulfide breakthrough time of 499 minutes and a breakthrough capacity of 0.127 g $H_2S$ per cc of carbon, demonstrating minimally complete recovery of catalytic activity in the gas phase.

EXAMPLE 5

A sample of the carbon deactivated at 450° C. by oxygen-containing air as described in Example 4 was exposed in a rotary kiln to temperatures of about 950° C. in a 2.5 gram per minute flow of steam for about 30 minutes. The sample was then cooled from 950° C. to ambient under an inert atmosphere. The Apparent Density of this reactivated sample was 0.45 g/cc indicating about a 12% loss in carbon structure due to surface oxide devolatization as well as gasification of the carbon structure by steam. However, the t-¾ time of the reactivated sample was 14 minutes, demonstrating nearly complete recovery of catalytic activity in the liquid phase. The reactivated sample also displayed a hydrogen sulfide breakthrough time of 460 minutes and a breakthrough capacity of 0.117 g $H_2S$ per cc of carbon, demonstrating minimally complete recovery of catalytic activity in the gas phase.

EXAMPLE 6

A sample of the carbon deactivated at 450° C. by oxygen-containing air as described in Example 4 was exposed in a rotary kiln to temperatures of about 950° C. in a 2.5 gram per minute flow of steam for about 30 minutes. The steam also contained about 2 volume % of oxygen introduced as air to the steam flow. The sample was then cooled from 950° C. to ambient under an inert atmosphere. The Apparent Density of this reactivated sample was 0.44 g/cc indicating about a 14% loss in carbon structure due to surface oxide devolatization as well as gasification of the carbon structure by steam and oxygen. However, the t-¾ time of the reactivated sample was 13 minutes, demonstrating nearly complete recovery of catalytic activity in the liquid phase. The reactivated sample also displayed a hydrogen sulfide breakthrough time of 469 minutes and a breakthrough capacity of 0.119 g $H_2S$ per cc of carbon, demonstrating minimally complete recovery of catalytic activity in the gas phase.

While the presently preferred embodiments of the invention have been described in particularity in the above examples, they may be otherwise embodied within the scope of the appended claims.

What is claimed is:

1. A method for restoring the catalytic activity of a deactivated nitrogen-treated carbonaceous char prepared by treatment of a carbonaceous material at temperatures above 700 C. in the presence of nitrogen-containing compounds, said method comprising exposing said deactivated nitrogen-treated carbonaceous char to temperatures greater than 700° C. for a period of time sufficient to reactivate said carbonaceous char.

2. The method of claim 1 wherein exposure of the said deactivated nitrogen-treated carbonaceous char to temperatures above 700° C. occurs in the presence of $H_2O$, carbon dioxide, or oxygen or any combination thereof.

3. The method of claim 1 wherein exposure of said deactivated nitrogen-treated carbonaceous char to temperatures above 700° C. occurs in an inert atmosphere.

4. The method of claim 3 wherein said inert atmosphere is comprised of $N_2$.

5. The method of claim 1, 2, or 3 wherein the restored nitrogen-treated carbonaceous char is cooled to temperatures less than 400° C. in an oxygen-free or otherwise inert atmosphere after exposure of said deactivated nitrogen-treated carbonaceous char to temperatures greater than 700° C.

6. The method of claim 5 wherein said carbonaceous char is cooled to a temperature of less than about 200° C.

* * * * *